US012525620B2

(12) United States Patent
Konink

(10) Patent No.: US 12,525,620 B2
(45) Date of Patent: Jan. 13, 2026

(54) FLOW FIELD PLATE AND COMPRESSOR COMPRISING SUCH PLATE

(71) Applicant: HYET HOLDING B.V., Arnhem (NL)

(72) Inventor: Jonne Konink, Arnhem (NL)

(73) Assignee: HyET Holding B.V., Arnhem (NL)

( * ) Notice: Subject to any disclaimer, the term of this patent is extended or adjusted under 35 U.S.C. 154(b) by 844 days.

(21) Appl. No.: 17/421,441

(22) PCT Filed: Nov. 21, 2019

(86) PCT No.: PCT/NL2019/050772
§ 371 (c)(1),
(2) Date: Jul. 8, 2021

(87) PCT Pub. No.: WO2020/145815
PCT Pub. Date: Jul. 16, 2020

(65) Prior Publication Data
US 2022/0123329 A1 Apr. 21, 2022

(30) Foreign Application Priority Data
Jan. 8, 2019 (NL) ..................................... 2022354

(51) Int. Cl.
*H01M 8/0258* (2016.01)
*H01M 8/0267* (2016.01)
*H01M 8/248* (2016.01)

(52) U.S. Cl.
CPC ....... *H01M 8/0258* (2013.01); *H01M 8/0267* (2013.01); *H01M 8/248* (2013.01)

(58) Field of Classification Search
CPC .. H01M 8/0258; H01M 8/0267; H01M 8/248; H01M 8/0662; H01M 2008/1095; H01M 2300/0065; H01M 16/003; H01M 8/026; Y02E 60/50; C01B 3/501; B01D 53/326; B01J 19/2475
See application file for complete search history.

(56) References Cited

U.S. PATENT DOCUMENTS

| | | | |
|---|---|---|---|
| 6,245,453 B1 * | 6/2001 | Iwase | H01M 8/0263 429/513 |
| 10,011,912 B2 | 7/2018 | Watanabe | |
| 2002/0168562 A1 * | 11/2002 | Funatsu | H01M 8/2483 29/432 |
| 2003/0170528 A1 * | 9/2003 | Simpson | H01M 8/023 429/534 |

(Continued)

FOREIGN PATENT DOCUMENTS

| | | |
|---|---|---|
| CN | 101359742 A | 2/2009 |
| CN | 102725893 B | 1/2016 |

(Continued)

*Primary Examiner* — Haroon S. Sheikh
(74) *Attorney, Agent, or Firm* — The Webb Law Firm

(57) ABSTRACT

The present invention relates to a flow field plate for a solid state compressor cell, including an essentially flat body, having two opposite surfaces and an edge, provided with a channel plan for gas distribution, that extends from multiple locations at a border of the field plate to multiple locations at the surface of the essentially flat body wherein the essentially flat body is provided with recesses at both sides, the recesses at each side including a first set of parallel lanes, crossing a second set of parallel lanes.

7 Claims, 3 Drawing Sheets

(56) References Cited

U.S. PATENT DOCUMENTS

| | | | |
|---|---|---|---|
| 2004/0058219 A1* | 3/2004 | Abdou | H01M 8/2483 |
| | | | 429/492 |
| 2004/0265672 A1* | 12/2004 | Wei | H01M 8/2485 |
| | | | 429/480 |
| 2005/0014059 A1* | 1/2005 | Kaye | H01M 8/0258 |
| | | | 429/514 |
| 2005/0133364 A1 | 6/2005 | Leonida | |
| 2006/0054221 A1* | 3/2006 | Steidle | H01M 8/0265 |
| | | | 137/561 A |
| 2006/0088746 A1 | 4/2006 | Tuma et al. | |
| 2008/0268318 A1* | 10/2008 | Jang | H01M 8/241 |
| | | | 429/492 |
| 2010/0098983 A1* | 4/2010 | Goto | H01M 8/0297 |
| | | | 429/450 |
| 2012/0299384 A1 | 11/2012 | Peled et al. | |
| 2015/0200401 A1* | 7/2015 | Vandenborre | C25B 9/73 |
| | | | 204/268 |
| 2015/0376800 A1 | 12/2015 | Lunt et al. | |
| 2017/0350024 A1* | 12/2017 | Bahar | C25B 1/02 |
| 2018/0094356 A1 | 4/2018 | Ukai | |
| 2018/0175406 A1* | 6/2018 | Kong | H01M 8/2483 |
| 2019/0305324 A1* | 10/2019 | Ichihara | H01M 8/12 |
| 2020/0313202 A1* | 10/2020 | Haußmann | H01M 8/0204 |

FOREIGN PATENT DOCUMENTS

| | | | | |
|---|---|---|---|---|
| EP | 3031955 B1 | | 10/2018 | |
| JP | 2005179780 A | | 7/2005 | |
| JP | 2007048538 A | * | 2/2007 | |
| JP | 2017525094 A | | 8/2017 | |
| JP | 201859181 A | | 4/2018 | |
| WO | WO-2008104860 A1 | * | 9/2008 | H01M 8/0258 |

\* cited by examiner

FLOW FIELD PLATE AND COMPRESSOR COMPRISING SUCH PLATE

CROSS-REFERENCE TO RELATED APPLICATIONS

This application is the United States national phase of International Application No. PCT/NL2019/050772 filed Nov. 21, 2019, and claims priority to The Netherlands Patent Application No. 2022354 filed Jan. 8, 2019, the disclosures of which are hereby incorporated by reference in their entirety.

BACKGROUND OF THE INVENTION

Field of the Invention

The invention relates to a flow field plate for a solid-state compressor cell. The invention further relates to a solid-state compressor and a compressor cell for electrochemically compressing a working fluid, comprising such a plate. In addition, the invention relates to a method for manufacturing such a plate assembly.

Description of Related Art

Where conventional mechanical compressors utilize mechanical means such as pistons or rotors for the compression of a fluid, solid-state compressors rely on the electrochemical transport of said fluid through a membrane using an ionic transport mechanism. In order to compress the working fluid in an electrochemical manner, a solid-state compressor typically comprises a compressor cell that is made up of one or more stacked membrane electrode assemblies (also known as MEA's). The electrodes of the MEA are connected to a power supply for maintaining an electric potential difference across the electrodes. This potential difference is necessary to electrochemically move the ionized working fluid through the proton exchange membrane (commonly known as a PEM) against the pressure gradient that exists across the membrane. The direction of the electrical current hereby determines the direction of the ionic transport, wherein the low-pressure working fluid is ionized at the positively charged anode and recombined with the separated electrons at the high-pressure cathode side of the MEA.

A commonly known solid-state compressor is the electrochemical hydrogen compressor wherein hydrogen is fed to the membrane electrode assembly and oxidized to protons and electrons. The protons are then driven through the membrane and the electrons are transferred via an external circuit, after which the protons and electrons are reduced back to molecular hydrogen. In this process, the hydrogen moves against a pressure gradient from an area of low pressure to an area of high pressure, resulting in the pressure rise across the membrane. The compression of other working fluids, such as water or ammonia are however also possible.

Solid-state compressors have several significant advantages over mechanical compressors. Namely, solid-state compressors have no moving parts, generally have a compact design and are capable of purifying the working fluid as the membrane typically allows for the transport of the ionized working fluid only. Moreover, solid-state compressors allow fluids to be compressed to very large pressures up to and above 1000 bar at operating efficiencies exceeding those of mechanical compressors.

In the process of compressing the working fluid it is desired to obtain the highest gain per volume unit of the compressor. For that reason, a high efficiency for each MEA is required. One of the factors that determines the efficiency is the distribution of the gas in the MEA. This distribution is determined for an important amount by the flow field plates. The better the distribution, the higher the efficiency. However, it has appeared that the flow field plates according to the state of the art do not have an optimal gas distribution. It is therefore a goal of the present invention to provide improved flow field plates, and a compressor comprising such improved flow field plates.

DESCRIPTION OF THE INVENTION

Figure 1:
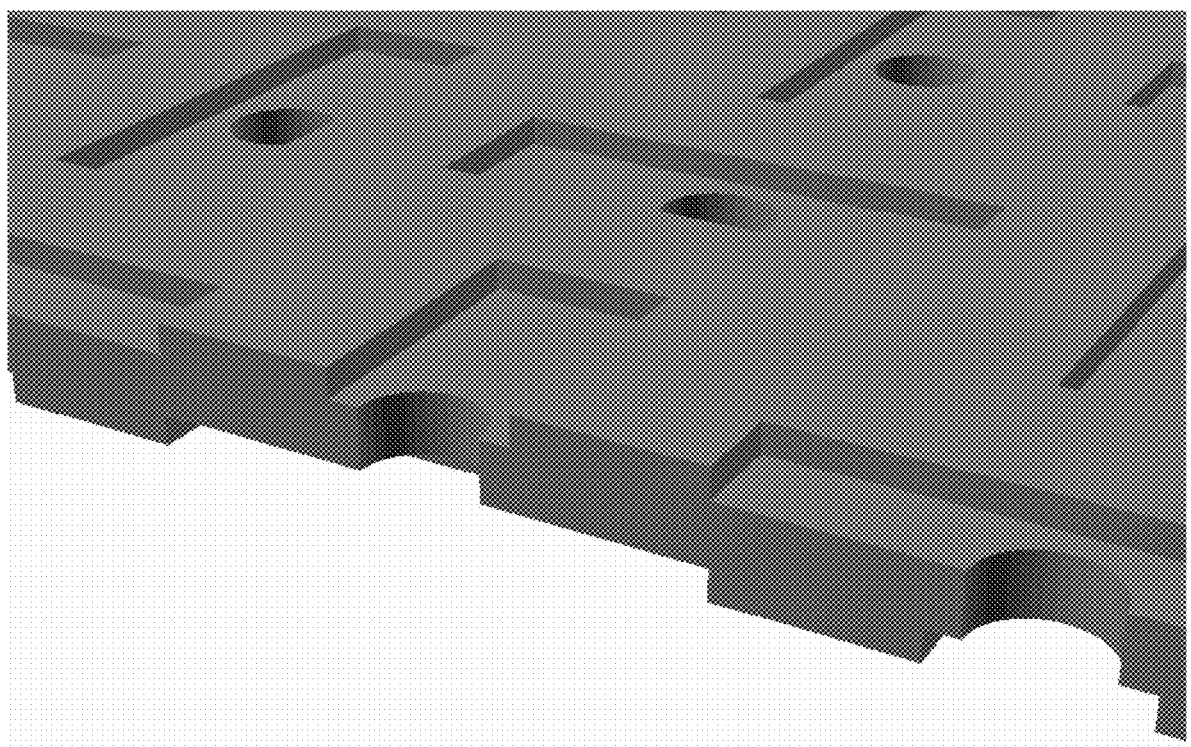
FIG. 1 is a sectional view of the invention.
Figure 2:
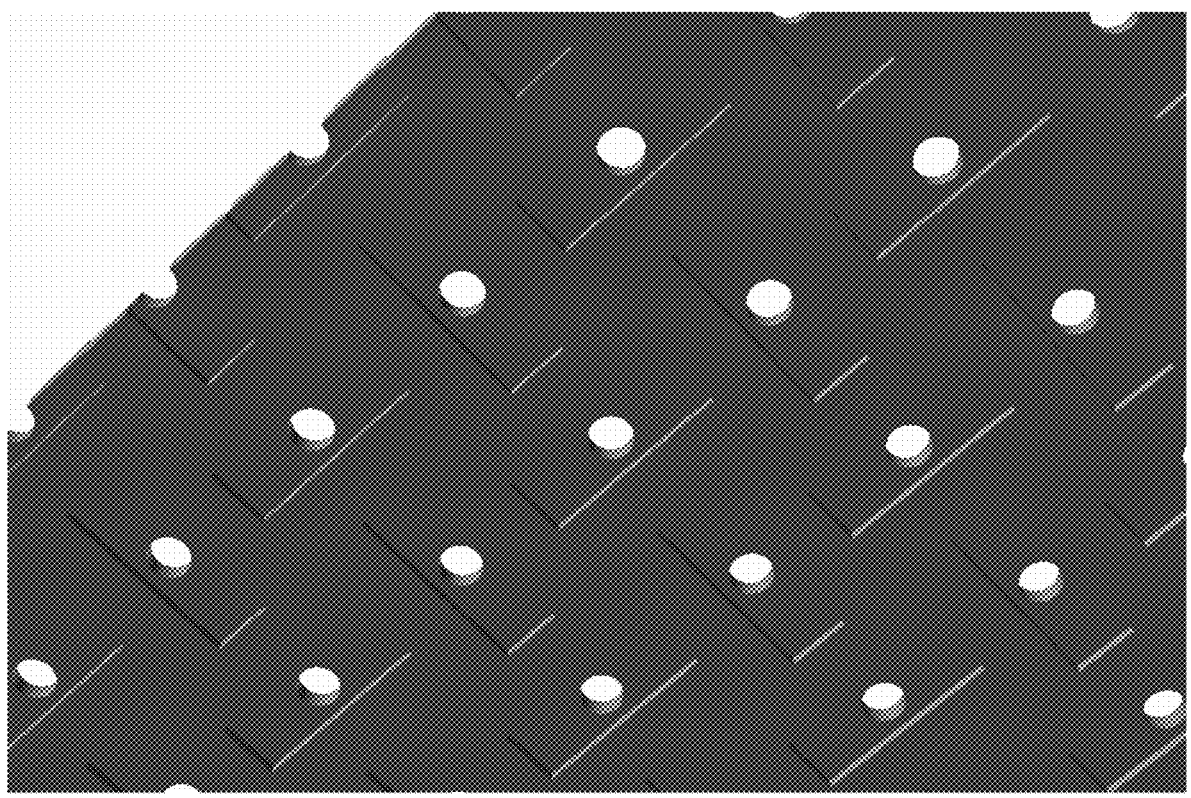
FIG. 2 is a bottom view of the invention.
Figure 3:
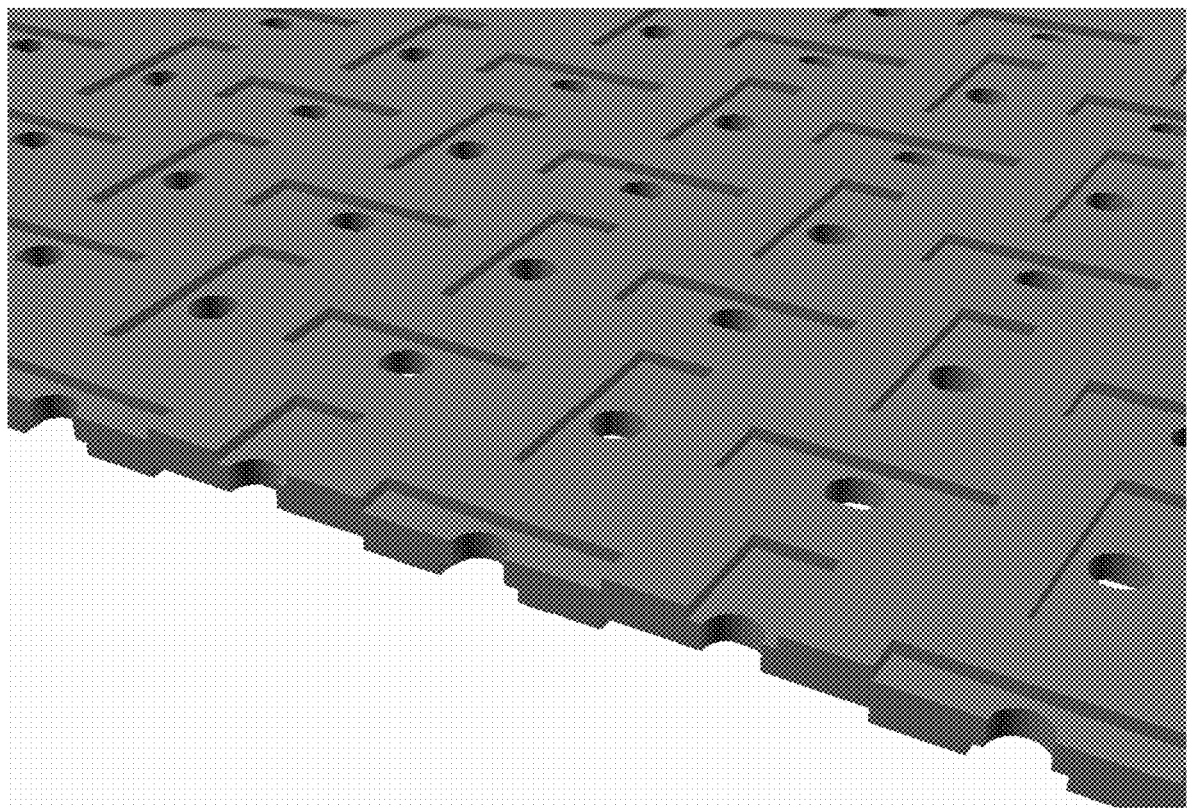
FIG. 3 is a top view of the invention.

The invention hereto proposes a flow field plate for a solid state compressor cell, comprising an essentially flat body having two opposite surfaces and an edge, provided with a channel plan for gas distribution, that extends from multiple locations at a border of the field plate to multiple locations at the surface of the essentially flat body wherein the essentially flat body is provided with recesses at both sides, the recesses at each side comprising a first set of parallel lanes, crossing a second set of parallel lanes.

It has appeared that a flow field plate comprising such channel plan has an increased distribution of the gas flow toward and from the membrane surface, which leads to a higher flow rate and a better use of the available membrane surface. Due to its architecture, the channel plan further decreases the mechanical resistance the gas undergoes, which further improves the performance of the compressor.

In a further embodiment of the flow field plate according to the invention claims the flat body comprises through holes, extending from the first surface to the second surface. Herewith the flow and distribution are further improved, and the mechanical resistance the gas undergoes further decreased. In particular a flow in both all directions of the plane, and the direction perpendicular thereto is allowed herewith.

In yet a further embodiment, the essentially flat body has a maximum thickness, defined as the length of a straight line from the one surface to the other surface, but less than 50% of the essentially flat body has this maximum thickness. At locations where the thickness is less than the maximum thickness, space for gas flow is available at the surface.

The flow field plate according to the invention may be formed out of multiple parts. This allows to create forms that cannot be achieved by state of the art techniques like etching, and—given the extreme small size of the recesses, channels and openings—also not yet by techniques like 3D printing. In particular two parts of the essentially flat body besides a recess may be separate parts.

The invention also relates to a solid state compressor cell, comprising two cell plates, enclosing a channel structure, formed by a number of recesses provided on a surface of one of the cell plates, used for the transport of a coolant and connecting a fluid feed on one end thereof and to a fluid discharge on another end thereof; and comprising a number of recesses provided on the outer surfaces of the cell plates facing away from the other cell plate, comprising at least two field plates as described above, positioned on the recessed outer surfaces of the cell plates to form further channel structures for supplying a working fluid to respectively diverting a working fluid away from a proton exchange membrane.

These field plates may be clamped between the cell plates together with the membrane, or diffusion-bonded with the cell plates. In any case, it is desired that the cell plates and the membrane are sealed in a fluid-tight manner.

It is also possible that the channel structure is configured for supplying a working fluid to or diverting a working fluid away from a proton exchange membrane. The channel structure may hereto connect directly to the membrane assembly, in a typical case consisting of a proton exchange membrane, on both sides sandwiched between a catalyst layer and optionally a gas diffusion layer. Alternatively, the channel structure may connect to a further channel structure provided in a further cell plate or flow plate, or enclosed between one of the two cell plates and said further cell plate or flow plate. In the direction of the plane, the size of the holes may preferably be between 10 and 240 micron, in the direction perpendicular it may be between 1 and 200 micron.

A thus formed flow plate has appeared to be mechanically sufficiently strong to withstand the forces in a compressor. Preferably the flow plate is made at least locally elastically deformable, in order to compensate for irregularities in the thickness of the membrane of the cell plates.

The invention claimed is:

1. A flow field plate for a solid-state compressor cell, comprising:
   an essentially flat body,
   a first surface and a second surface formed on opposite sides of the essentially flat body,
   each of the first and second surfaces comprising a first set of recesses extending in a first direction and a second set of recesses extending in a second direction crossing the first direction, wherein each of the first set of recesses and each of the second set of recesses are separately formed from one another and wherein the flat body comprises through holes, said through holes extending from the first surface to the second surface.

2. The flow field plate according to claim 1, wherein the essentially flat body has a maximum thickness, defined as the length of a straight line from the first surface to the second surface, wherein less than 50% of the essentially flat body has the maximum thickness.

3. The flow field plate according to claim 1, formed out of multiple parts.

4. The flow field plate according to claim 3, wherein two parts of the essentially flat body besides a recess are separate parts.

5. The flow field plate according to claim 1, wherein the through holes have a size between 1 and 200 micron.

6. The flow field plate according to claim 1, comprising holes having a size between 10 and 240 micron.

7. The flow field plate according to claim 1, wherein the flow field plate is at least partially elastic.

* * * * *